(12) United States Patent
Öhlert et al.

(10) Patent No.: US 6,340,172 B1
(45) Date of Patent: Jan. 22, 2002

(54) AIRBAG MODULE

(75) Inventors: Franz Öhlert, Aalen-Hofen; Hans-Joachim Tietze, Heubach, both of (DE)

(73) Assignee: TRW Occupant Restraint Systems GmbH & Co. KG, Alfdorf (DE)

(*) Notice: Subject to any disclaimer, the term of this patent is extended or adjusted under 35 U.S.C. 154(b) by 0 days.

(21) Appl. No.: 09/623,537

(22) PCT Filed: Mar. 4, 1999

(86) PCT No.: PCT/EP99/01416

§ 371 Date: Sep. 5, 2000

§ 102(e) Date: Sep. 5, 2000

(87) PCT Pub. No.: WO99/44864

PCT Pub. Date: Sep. 10, 1999

(30) Foreign Application Priority Data

Mar. 6, 1998 (DE) .................................. 298 03 985 U

(51) Int. Cl.⁷ .............................................. B60R 21/22
(52) U.S. Cl. .................................................. 280/730.2
(58) Field of Search ......................... 280/728.1, 728.2, 280/730.1, 730.2, 733, 743.1, 743.2

(56) References Cited

U.S. PATENT DOCUMENTS 3,687,485 A * 8/1972 Campbell .................. 280/746
5,322,322 A * 6/1994 Bark et al. ................. 280/730
6,095,551 A * 8/2000 O'Docherty ............. 280/730.2

FOREIGN PATENT DOCUMENTS

| DE | 4238427 | 5/1993 |
|---|---|---|
| DE | 4307175 | 9/1993 |
| DE | 29615485 | 2/1997 |
| DE | 29616904 | 3/1997 |
| DE | 19611575 | 9/1997 |
| DE | 29705489 | 9/1997 |
| DE | 19612228 | 10/1997 |
| DE | 0816180 | 1/1998 |
| DE | 19627181 | 1/1998 |
| DE | 19635495 | 3/1998 |
| DE | 29716573 | 3/1998 |

* cited by examiner

Primary Examiner—Paul N. Dickson
Assistant Examiner—Faye M. Fleming
(74) Attorney, Agent, or Firm—Tarolli, Sundheim, Covell, Tummino & Szabo L.L.P.

(57) ABSTRACT

A gas bag module for a vehicle occupant restraint system, comprising a gas bag (40) provided for being translated from a space-saving folded condition into a deployed condition in which it extends along the inner side of at least part of the side structure of the vehicle, at least one tensioning means (56) provided to connect the gas bag (40) to the side structure of the vehicle in the region of its C-column (48), is characterized in that said tensioning means (56) is connected to said gas bag (40) spaced away from its end assigned to said C-column (48).

8 Claims, 6 Drawing Sheets

AIRBAG MODULE

FIELD OF THE INVENTION

The invention relates to a gas bag module for a vehicle occupant restraint system, comprising a gas bag provided for being translated from a space-saving folded condition into a deployed condition in which it extends along the inner side of at least part of the side structure of the vehicle, at least one tensioning means provided to connect the gas bag to the side structure of the vehicle in the region of its C-column.

The invention relates furthermore to a vehicle interior lining including such a gas bag module.

BACKGROUND OF THE INVENTION

With gas bag modules of the cited kind, a gas bag is tensioned along the inner side of the side structure of the vehicle and protects in the case of a side impact the head of the vehicle occupant from impact on the side structure of the vehicle. The top edge of the gas bag is secured over its full length to a housing arranged along a roof column. One rear lower corner and one front lower corner of the gas bag are connected by tensioning means to the C-column and A-column, respectively, of the vehicle so that the full surface area of the gas bag is tensioned. To afford protection in the region of the C-column, the gas bag is tensioned at least over a portion of the C-column. In the deployed condition of the gas bag, the tensioning means runs from the rear lower corner of the gas bag, located so as to face the C-column, to a fastening point on the C-column located even further to the rear. During deployment the tensioning means and/or the gas bag bursts through a vehicle column lining provided on the C-column so that the lining is configured either in two parts or is provided with a tear line which during deployment of the gas bag is torn open by the deploying gas bag and the tensioning means secured thereto. Thereby, the portion surrounding the rear lower corner of the gas bag, held by the tensioning means, is able to gain access in the course of deployment to the side of the C-column lining facing the vehicle interior so that protection is offered to an impacting vehicle occupant in the region of the C-column lining. The problem in this respect is, however, arranging a belt retractor on the C-column since this could possibly obstruct the tensioning means during deployment.

The intention of the invention is to facilitate deployment of the gas bag without having to sacrifice protection in the region of the C-column.

BRIEF SUMMARY OF THE INVENTION

For this purpose there is provided in accordance with the invention a gas bag module for a vehicle occupant restraint system, comprising a gas bag provided for being translated from a space-saving folded condition into a deployed condition in which it extends along the inner side of at least part of the side structure of the vehicle, at least one tensioning means provided to connect the gas bag to the side structure of the vehicle in the region of its C-column, in which the tensioning means is connected to the gas bag spaced away from its end assigned to the C-column. By arranging the tensioning means spaced away from the end of the gas bag assigned to the C-column it is to be understood that the tensioning means is connected to the gas bag at a location which is remote from the corresponding end of the gas bag by at least half the length of the tensioning means. Such a gas bag module facilitates deployment of the gas bag since the end of the gas bag assigned to the C-column is able to deploy freely over the C-column without being obstructed by a tensioning means. Contrary to conventional opinion according to which a gas bag for offering protection in a side impact situation needs to be tensioned at its corners, it has been surprisingly discovered that the gas bag in accordance with the invention offers protection in a side impact situation also in the region of the end assigned to the C-column. In the inflated condition the gas bag comprises a specific degree of inherent stability so that the end assigned to the C-column is not displaced even when cushioning the impact of a vehicle occupant. Since the end assigned to the C-column is located between the head of the vehicle occupant and the C-column when cushioning the vehicle occupant, the counterhold needed to provide protection also exists even without tensioning the corners of the gas bag.

In one aspect of the invention the length of the tensioning means is dimensioned such that the end not connected to the gas bag when the gas bag is deployed is located in the region of the gas bag. In this way a compact arrangement of the gas bag module is achieved in the vehicle.

In another aspect the tensioning means is connected to the gas bag remote from the bottom edge. A location remote from the bottom edge of the gas bag is understood to mean an arrangement in which the tensioning means is arranged above the bottom edge of the gas bag by at least the width of the tensioning means. This aspect, too, is based on the surprising discovery that a gas bag need not be tensioned at its corners to offer protection in the course of a side impact, yet creating a greater freedom in dimensioning the gas bag and in arranging the tensioning means.

Also proposed is a vehicle interior lining comprising a gas bag module in accordance with the invention and comprising a vehicle column lining, the gas bag being arranged in the folded condition outside of the region covered by the vehicle column lining, wherein a ramp leading to the side of the vehicle column lining facing the vehicle interior is arranged between the folded gas bag and the vehicle column lining. Due to the ramp being arranged between the folded gas bag and the vehicle column lining, a portion of the gas bag can be caused during deployment—even without being retained by a tensioning means—to gain access to the side of the vehicle column lining facing the vehicle interior. Since the tensioning means is connected to the gas bag ahead of its end assigned to the C-column, the gas bag is able to deploy without the tensioning means or the gas bag needing to burst through the vehicle column lining. As a result of this, a one-piece configuration of the vehicle column lining can be selected or a tear line provided in the vehicle column lining can be omitted whilst still achieving protection in the region of the vehicle column lining.

In another aspect of the invention the vehicle column lining covers the C-column and the end of the tensioning means connected to the C-column, and the tensioning means emerges in the deployed condition of the gas bag between the C-column lining and the vehicle column. In this way the gas bag can be tensioned at a point behind the vehicle column lining without a two-part lining being necessary. During deployment of the gas bag the tensioning means is extracted from between the vehicle column and the vehicle column lining.

In yet another aspect the gas bag is arranged in the folded condition between the C-column and an interior space lining, the latter adjoining the vehicle column lining and being configured flexible in a region opposite the ramp, as a result of which the folded gas bag can be arranged concealed from the vehicle occupant. On activation of the inflator the gas bag emerges from behind the interior lining guided by the ramp and gains access to the side of the vehicle column lining facing the vehicle interior.

It is likewise of advantage when the end of the tensioning means connected to the C-column is arranged slightly above a level defined by the door breast and adjoining a window cutout in the side structure of the vehicle, and when the tensioning means in the folded condition of the gas bag is installed along the window cutout. Due to these measures the tensioning means moves during deployment only at the edge of the C-column facing the window cutout, so that a belt retractor can be arranged at the C-column without the tensioning means and the gas bag being obstructed during deployment.

Advantageously a tensioning line runs slightly above a level defined by the door breast of the vehicle along the side structure thereof in the folded condition of the gas bag, starting from the end of the tensioning means connected to the gas bag. Such an arrangement of the tensioning line ensures occupant protection in a roll-over of the vehicle.

BRIEF DESCRIPTION OF THE DRAWINGS

Further features and advantages of the invention read from the following description and from the drawing to which reference is made and in which.

DESCRIPTION OF AN EXAMPLE EMBODIMENT

Figure 1:
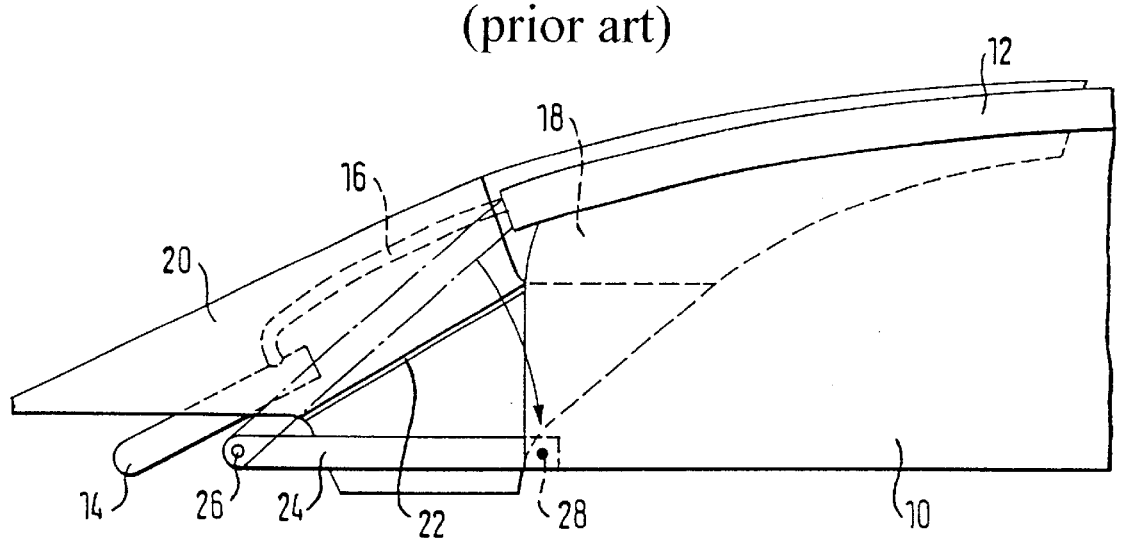
FIG. 1 is a section-wise and schematic view of the gas bag module and a vehicle interior lining according to prior art.

Referring now to FIG. 1 there is illustrated schematically a gas bag module in accordance with prior art, comprising in the deployed condition a gas bag 10, a housing 12 for accommodating the gas bag 10 in the folded condition and an inflator 14 for inflating the gas bag 10. The inflator 14 is connected to the housing 12 by a conduit 16. The inflator 14 is arranged in the region of a vehicle C-column 18 which is covered by a C-column lining 20 toward the vehicle interior. Parts located behind the gas bag 10 and the C-column lining 20, respectively, are depicted by a broken line. The C-column lining 20 is provided with a tear line 22 which in the illustrated condition of the deployed gas bag 10 is already parted. The C-column lining 20 has been opened up in the course of the deployment of the gas bag 10 by a tensioning means 24 which is configured as a tensioning strap and has moved from its broken line starting position into its final position parallel to the bottom edge of the gas bag 10. Instead of the tensioning strap, any other tensioning means having a circular cross-section could of course be used.

The tensioning strap 24 describes during the deployment of the gas bag 10 a substantially circular movement about a first vehicle-fixed point 26 as is indicated by an arrow. The tensioning strap 24 is secured to the gas bag 10 by a first anchorage point 28 to a rear lower corner of the gas bag. A second vehicle-fixed point (not shown) is located at a vehicle A-column and is connected via a second tensioning strap (not shown) to a front lower corner of the gas bag 10 so that the full surface area of the gas bag 10 is tensioned along the side structure of the vehicle.

Figure 2:
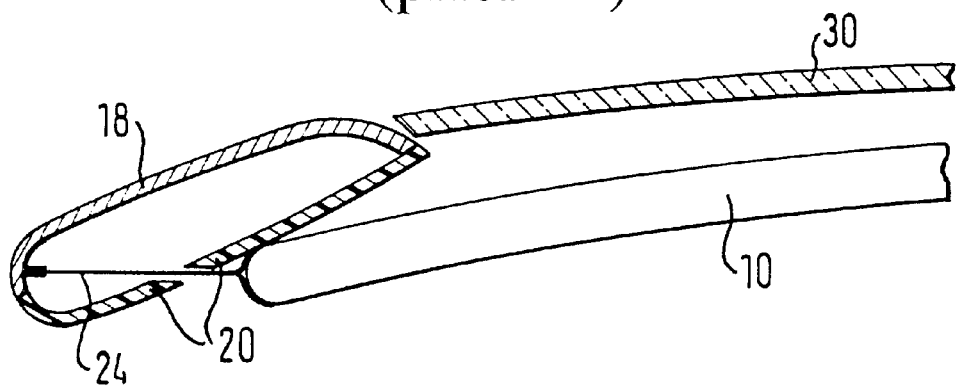
FIG. 2 is a schematic drawing illustrating a section through a C-column incorporating a gas bag module and a vehicle interior lining according to prior art.

Referring now to FIG. 2 there is illustrated schematically the C-column 18 and the side window 30 of a vehicle. The C-column 18 is covered toward the vehicle interior by the C-column lining 20. Likewise evident is the deployed gas bag 10 which is connected to the C-column 18 by the tensioning strap 24. To ensure vehicle occupant protection on a side impact in the region of the C-column 18, the gas bag 10 as evident from FIG. 1 and FIG. 2 needs to cover in the inflated condition at least part of the C-column 18. In prior art, as evident from FIG. 2, this is achieved by the tensioning strap 24 secured to the rear lower corner of the gas bag 10, which strap retains the gas bag 10 during its deployment and in the inflated condition in the region of the C-column 18. As clearly evident from FIG. 2 the C-column lining 20 for this purpose needs to be two-part or provided with a tear line so that the gas bag 10 and/or the tensioning strap 24 are able to pass through the C-column lining 20.

Figure 3:
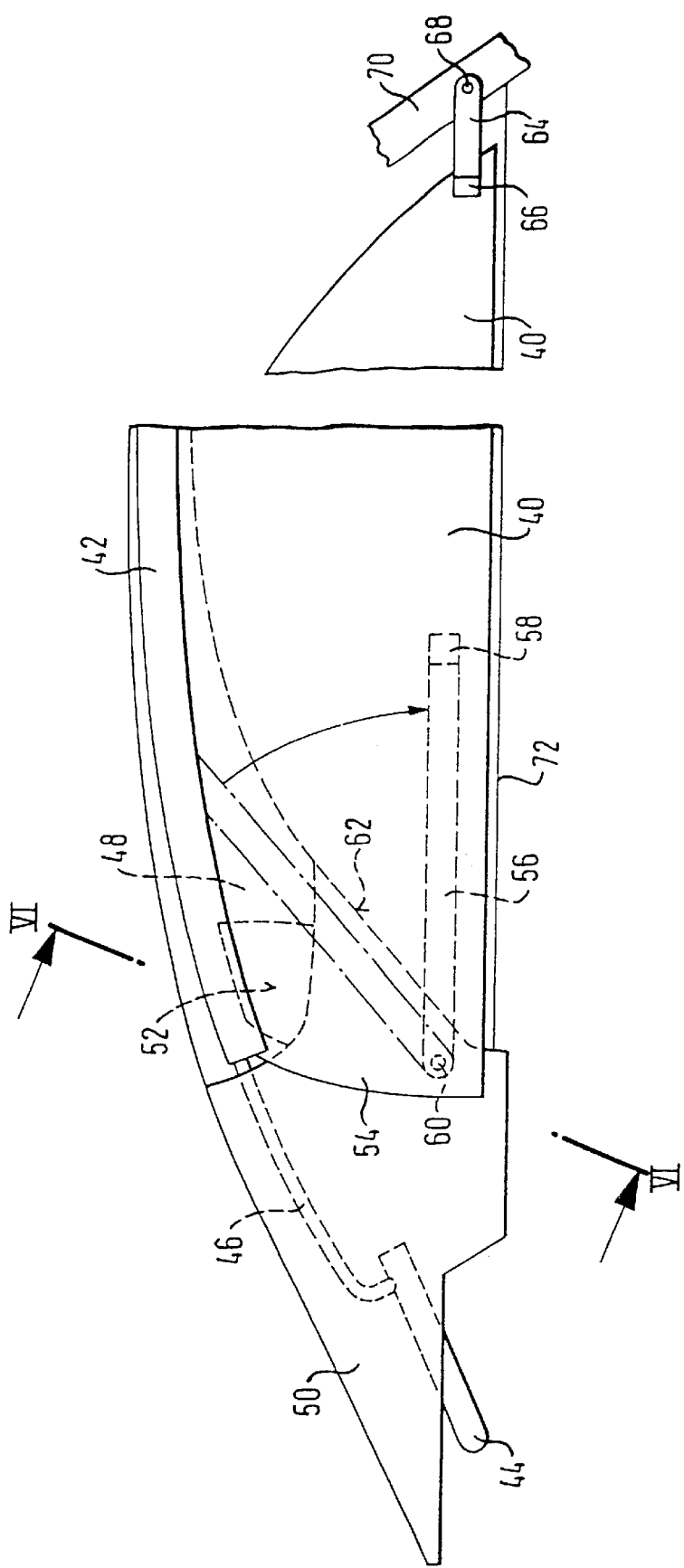
FIG. 3 is a section-wise schematic view of the gas bag module and a vehicle interior lining according to the invention.

The gas bag module in accordance with the invention as evident from FIG. 3 is provided with a gas bag 40, a housing 42 for accommodating the gas bag 40 in the folded condition, and an inflator 44. In FIG. 3 too, concealed parts are indicated by broken lines, including the conduit 46 which connects the inflator 44 to the housing 42. A C-column 48 has a C-column lining 50 concealing it from the vehicle interior. The housing 42 is arranged above the C-column lining 50, and a ramp 52 serves to guide the gas bag 40 during its deployment action from the housing 42 to the side of the C-column lining 50 facing the vehicle interior. Thereby, a corner portion of the gas bag 40 gains access during deployment to in front of the C-column lining 50. The end 54 of the gas bag 40 assigned to the C-column is located in the deployed condition on the C-column lining 50. A tensioning strap 56 connects a first anchorage point 58 arranged on the gas bag 40 to a first vehicle-fixed point 60 arranged on the C-column 48. The first anchorage point 58 is located remote from the end 54 of the gas bag 40 assigned to the C-column 48 by half the length of the tensioning strap 56 and is located above the bottom edge of the gas bag 40 by the width of the tensioning strap 56. The end 54 of the gas bag 40 assigned to the C-column thus moves—during deployment—over the C-column lining 50 without being obstructed. In the inflated condition of the gas bag, the end 54 of the gas bag assigned to the C-column is retained by the inherent stability of the inflated gas bag 40 in the position as shown, i.e. above the C-column lining 50. The starting position of the tensioning strap 56 with the gas bag 40 folded in the housing 42 is indicated dot-dashed. The tensioning strap 56 describes in the course of deployment a substantially circular path about the first vehicle-fixed point 60 as indicated by the arrow. In so doing, the tensioning strap 56 is extracted from between the C-column 48 and the C-column lining 50 at the line of contact 62 thereof. Also indicated in FIG. 3 is a front portion of the gas bag 40 which is connected to a second vehicle-fixed point 68 on an A-column 70 via a second tensioning strap 64 which is secured to the gas bag 40 at a second anchorage point 66. This results in an anchorage line of the gas bag 40 from the first C-column 48 to the second anchorage point 66, which line is located only slightly above an indicated door breast 72.

Figure 4:
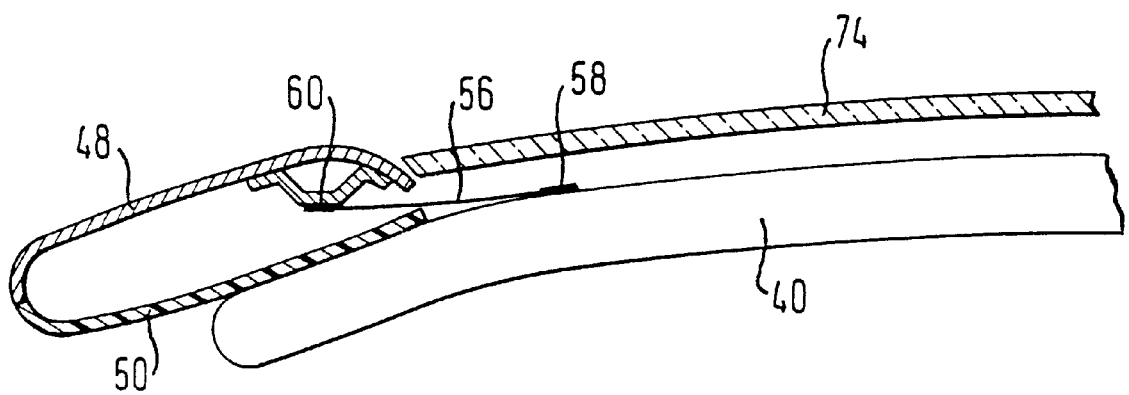
FIG. 4 is a schematic drawing illustrating a section through a C-column incorporating a gas bag module and a vehicle interior lining according to the invention.

This is made clearer by the schematic drawing as shown in FIG. 4 showing the C-column 48 adjoining a side window 74. The C-column 48 is concealed from the vehicle interior by the C-column lining 50. The deployed gas bag 40 covers part of the C-column lining 50 thus providing the vehicle occupant with protection against side impact. The gas bag 40 is restrained by the tensioning strap 56 extending from the first vehicle-fixed point 60 to the first anchorage point 58 on the gas bag 40, the tensioning strap 56 emerging here from between the C-column lining 50 and the C-column 48. Thereby the C-column lining 50 may be configured simplified integral and without a tear line since the tensioning strap 56 is extracted, during deployment of the gas bag 40, at the line of contact between the C-column 48 and the C-column lining 50.

Figure 5:
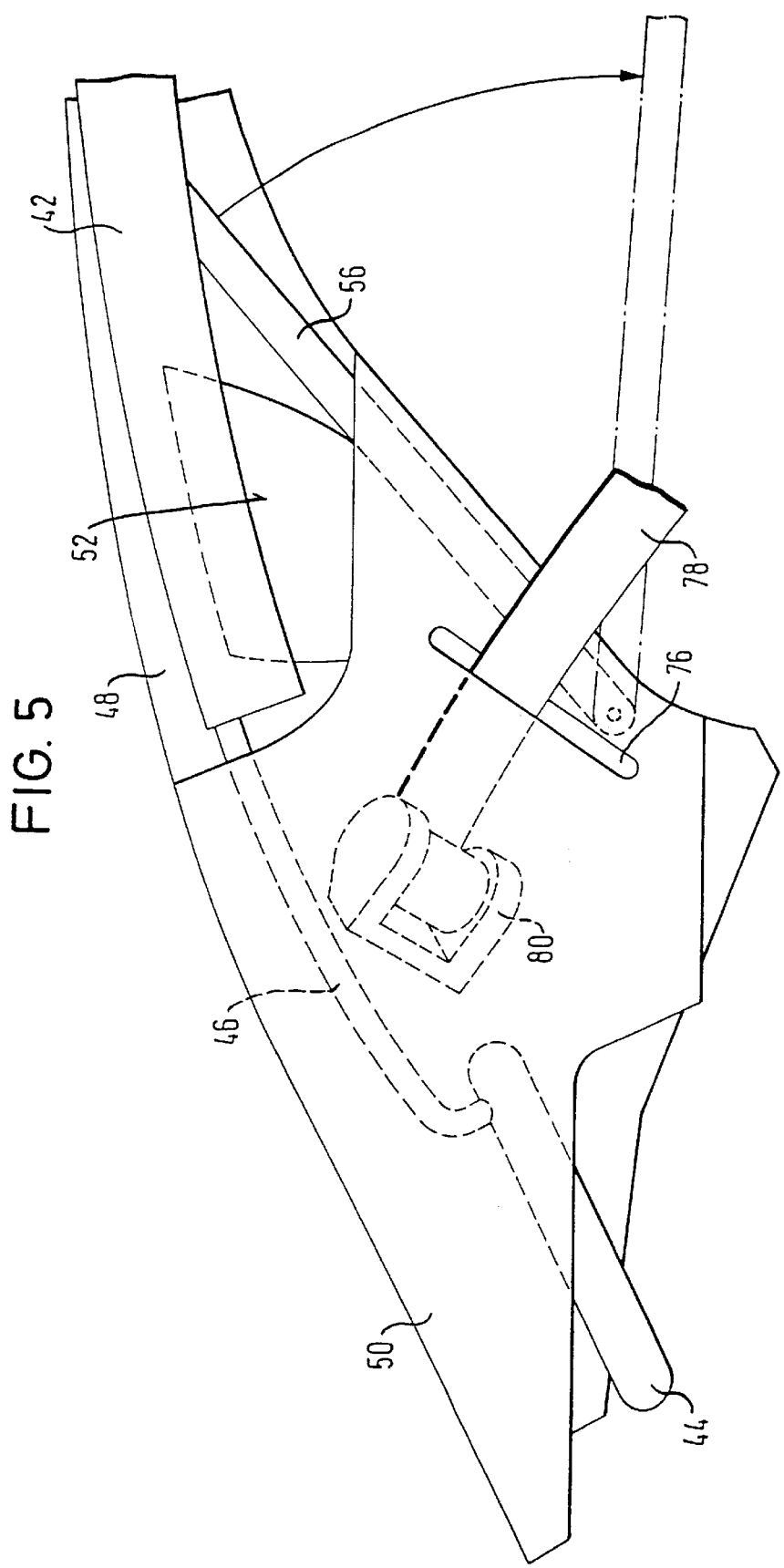
FIG. 5 is a more detailed view of the gas bag module and vehicle interior lining as shown in FIG. 3 with the gas bag in the folded condition.

Referring now to FIG. 5 there is illustrated in detail the gas bag module as shown in FIG. 3. Unlike the configuration as shown in FIG. 3, the gas bag module is depicted here with the gas bag folded. The outlines of components concealed in the plan view as shown in FIG. 5 are indicated by broken lines. In the folded condition the gas bag is accommodated in the housing 42 which is connected to the inflator 44 by the conduit 46. Parts of the inflator 44 and the conduit 46 are concealed by the C-column lining 50. The ramp 52 leads from the housing 42 to the side of the C-column lining 50 facing the vehicle interior. The ramp 52 is secured to the C-column 48. The tensioning strap 56 is installed along the window cutout in the folded condition of the gas bag as illustrated. The movement of the tensioning strap 56 on deployment of the gas bag is indicated by the arrow in FIG. 5 and the final position of the tensioning strap 56 with the gas bag fully deployed is indicated dot-dashed. The C-column lining 50 is provided in addition with an elongated hole 76 provided for passage of a belt webbing 78. The belt webbing 78 is assigned to a belt retractor 80 arranged on the C-column 48, this belt retractor being arranged behind the C-column lining 50 and thus being illustrated by a broken line in FIG. 5. In both the folded and deployed condition of the gas bag the tensioning strap 56 is located behind the belt webbing 78, as viewed from the interior of the vehicle. The movement of the tensioning strap 56 during deployment is thus not obstructed by the belt webbing 78.

Figure 6:
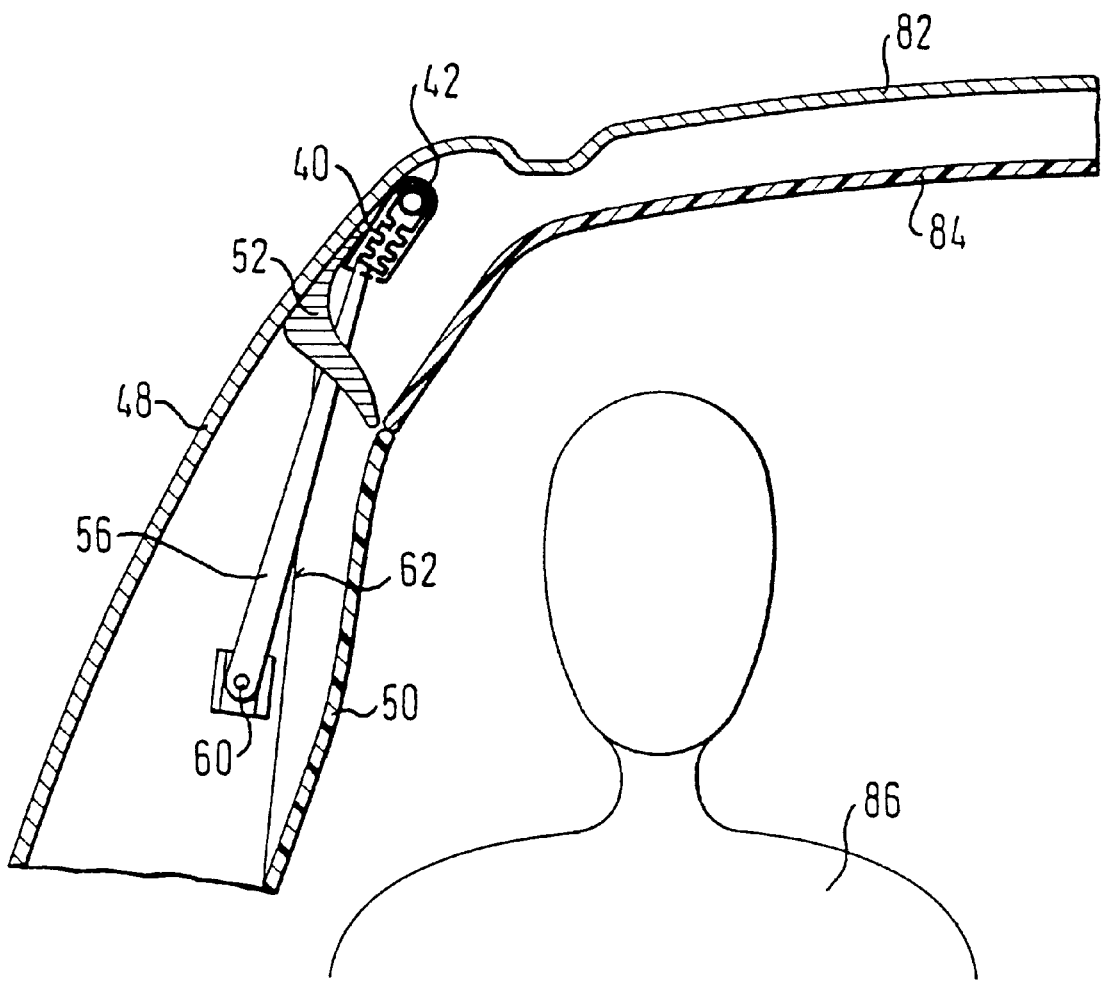
FIG. 6 is a section view of the gas bag module and the vehicle interior lining of FIG. 3 along the line VI—VI, with the gas bag in the folded condition

Referring now to FIG. 6 there is illustrated a section view to clearly show how the gas bag module in accordance with the invention and the vehicle interior lining in accordance with the invention are fitted, it showing section-wise the C-column 48 continuing into a roof portion 82. The C-column 48 is concealed from the vehicle interior by the C-column lining 50. C-column 48 and C-column lining 50 adjoin each other at a window cutout at the line of contact 62. Adjoining the C-column lining 50 is the headlining 84. Arranged behind the headlining 84 is the housing 42 with the gas bag 40 folded therein. The tensioning strap 56 is installed from the gas bag 40 folded in the housing 42 to the first vehicle-fixed point 60 at the C-column 48. The ramp 52 leads to a line of contact between C-column lining 50 and headlining 84. Indicated schematically in the vehicle interior is a vehicle occupant 86.

Figure 7:
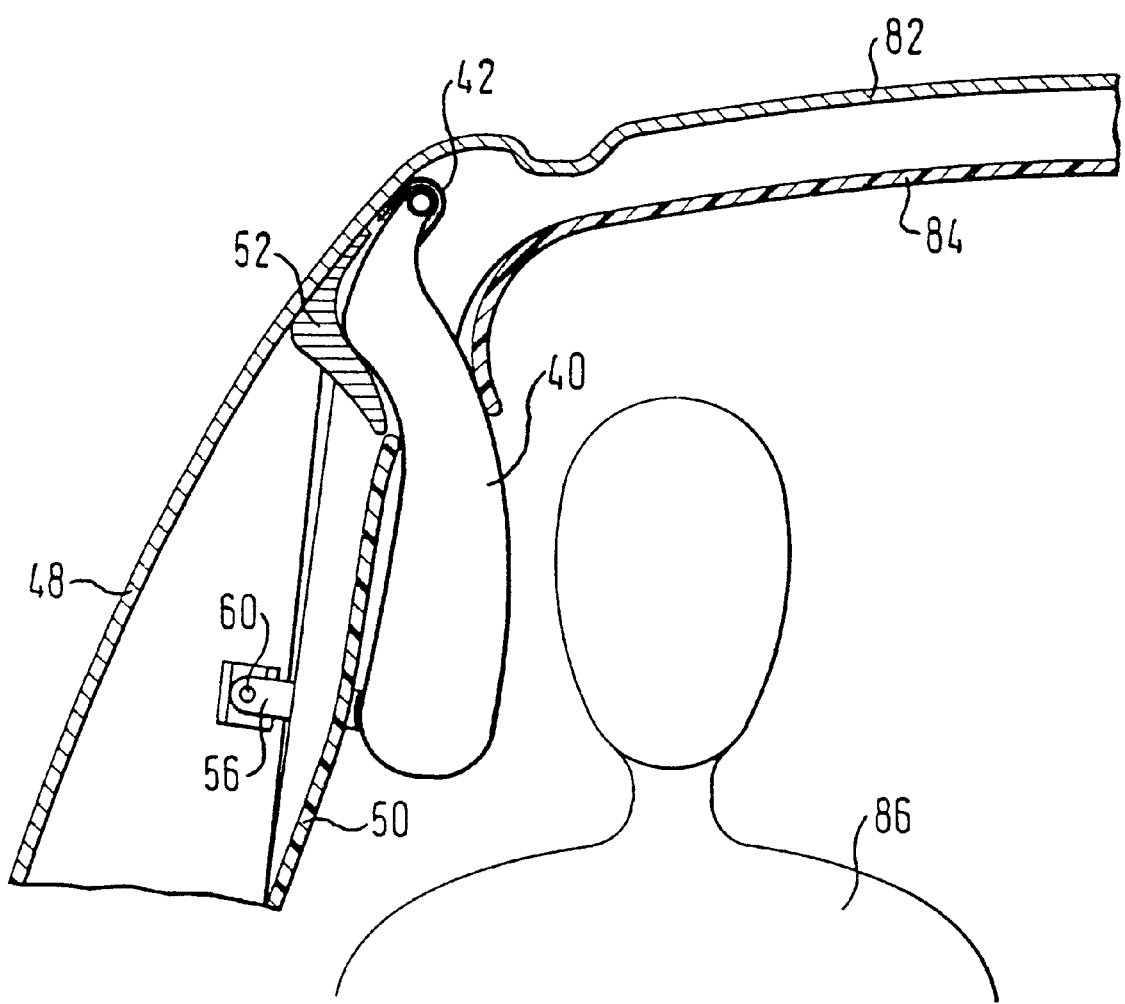
FIG. 7 is a section view of the gas bag module and the vehicle interior lining of FIG. 3 along the line VI—VI, with the gas bag in the deployed condition.

Referring now to FIG. 7 there is illustrated a gas bag module and the vehicle interior lining as shown in FIG. 6 with the gas bag 40 deployed. In this arrangement the ramp 52 has guided the gas bag 40 from the housing 42 to the side of the C-column lining 50 facing the vehicle interior and is thus located between the head of the vehicle occupant 86 and the C-column lining 50. As evident from FIG. 7 the headlining 84 is configured flexible in a portion opposite the ramp 52 to thus permit emergence of the gas bag 40 into the vehicle interior. During the deployment action, the tensioning strap 56 has been extracted from between the C-column 48 and the C-column lining 50. It is to be noted that whilst the gas bag portion—guided by the ramp 52 to the side of the C-column lining 50 facing the vehicle interior—offers protection to the vehicle occupant 86 in the region of the C-column 48, the tensioning strap 56 together with the gas bag 40 and the tensioning strap 64 as shown in FIG. 3 causes a tensioning of the gas bag, permitting protection of the vehicle occupant 86 also in case the vehicle should roll over.

From the above description of the invention, those skilled in the art will perceive improvements, changes and modifications. Such improvements, changes and modifications within the skill of the art are intended to be covered by the appended claims.

Having described the invention, the following is claimed:

1. A gas bag module for a vehicle occupant restraint system, said gas bag module comprising a gas bag (40) having a folded condition and a deployed condition, said gas bag in said deployed condition extending along the inner side of a vehicle side structure; and at least one tensioning means (56) connecting the gas bag (40) to a C-column (48) of the vehicle side structure, said tensioning means (56) being connected to said gas bag (40) at a location spaced away from its end assigned to said C-column (48), the length of said tensioning mean (56) being dimensioned such that the end not connected to said gas bag (40), when said gas bag (40) is deployed, is located in the region of said gas bag (40).

2. The gas bag module as set forth in claim 1, characterized in that said tensioning means (56) is connected to said gas bag (40) remote from the bottom edge thereof.

3. A vehicle interior lining comprising a gas bag module for a vehicle occupant restraint system, said gas bag module including a gas bag (40) having a folded condition and a deployed condition, said gas bag, in said deployed condition, extending along the inner side of a vehicle side structure; at least one tensioning means (56) connecting the gas bag (40) to a C-column (48) of the vehicle side structure, said tensioning means (56) being connected to said gas bag (40) at a location spaced away from its end assigned to said C-column (48), said vehicle interior lining further comprising a vehicle column lining (50), said gas bag (40) being arranged in the folded condition outside of the region covered by said vehicle column lining (50), characterized in that a ramp (52) leading to the side of said vehicle column lining (50) facing said vehicle interior being arranged between said folded gas bag (40) and said vehicle column lining (50).

4. The vehicle interior lining as set forth in claim 3, characterized in that said vehicle column lining (50) covers said C-column (48) and the end of said tensioning means (56) connected to said C-column (48) and that said tensioning means (56) emerges in the deployed condition of said gas bag (40) between said C-column lining (50) and said C-column (48).

5. The vehicle interior lining as set forth in claim 3, characterized in that said gas bag (40) is arranged in the folded condition between said C-column (48) and an interior space lining (84), the interior space lining (84) adjoining said vehicle column lining (50) and configured flexible in a region opposite said ramp (52).

6. The vehicle interior lining as set forth in claim 3, characterized in that the end of said tensioning means (56) connected to said C-column (48) is arranged slightly above a level defined by a door breast (72) and adjoining a window cutout in said side structure, and that said tensioning means (56) in the folded condition of said gas bag (40) is installed along said window cutout.

7. The vehicle interior lining as set forth in claim 3, characterized in that starting from the end of said tensioning means (56) connected to said gas bag (40) in the folded condition of said gas bag (40), a tensioning line runs slightly above a level defined by a door breast (72) along said side structure thereof.

8. The vehicle interior lining as set forth in claim 7, characterized in that the end of said tensioning means (56) connected to said gas bag (40) is located in the deployed condition of said gas bag (40) slightly above said level defined by said door breast (72) and in the middle of a rim of a window cutout adjoining said door breast (72).

* * * * *

UNITED STATES PATENT AND TRADEMARK OFFICE
Certificate

Patent No. 6,340,172 B1                              Patented: January 22, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Franz Öhlert, Aalen-Hofen, Germany; Hans-Joachim Tietze, Heubach, Germany; and Ulrich Tschaschke, Ehningen, Germany.

Signed and Sealed this Twenty-ninth Day of March 2005.

PAUL N. DICKSON
*Supervisory Patent Examiner*
Art Unit 3616